United States Patent
Cassell et al.

(10) Patent No.: US 8,740,711 B2
(45) Date of Patent: Jun. 3, 2014

(54) EXTENDED PLUNGE CONSTANT VELOCITY JOINT

(75) Inventors: Robert L. Cassell, Lake Orion, MI (US); David G. Sasseen, Lapeer, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 20 days.

(21) Appl. No.: 13/503,058

(22) PCT Filed: Oct. 21, 2009

(86) PCT No.: PCT/US2009/061467
§ 371 (c)(1),
(2), (4) Date: Apr. 20, 2012

(87) PCT Pub. No.: WO2011/049563
PCT Pub. Date: Apr. 28, 2011

(65) Prior Publication Data
US 2012/0214604 A1    Aug. 23, 2012

(51) Int. Cl.
*F16D 3/223* (2011.01)
(52) U.S. Cl.
USPC .......................................... 464/15; 464/906

(58) Field of Classification Search
USPC ............... 464/7, 15, 111, 140, 141, 142, 143, 464/144, 145, 146, 173, 174, 904, 905, 906, 464/169
See application file for complete search history.

(56) References Cited

U.S. PATENT DOCUMENTS

| | | | |
|---|---|---|---|
| 4,116,020 A * | 9/1978 | Aucktor et al. | 464/145 |
| 4,464,143 A | 8/1984 | Bowyer | |
| 4,476,950 A * | 10/1984 | Welschof | 464/169 X |
| 5,899,814 A | 5/1999 | Murillo | |
| 6,733,396 B2 * | 5/2004 | Skvarla et al. | 464/145 |
| 7,922,590 B2 * | 4/2011 | Pallante | 464/905 X |
| 2001/0016520 A1 | 8/2001 | Sahashi et al. | |
| 2003/0196846 A1 * | 10/2003 | Masuda et al. | |
| 2007/0105461 A1 | 5/2007 | Lyon et al. | |

* cited by examiner

*Primary Examiner* — Gregory Binda
*Assistant Examiner* — Matthieu Setliff
(74) *Attorney, Agent, or Firm* — Jennifer M. Brumbaugh; Reising Ethington P.C.

(57) ABSTRACT

An outer race assembly for a constant velocity joint may include an outer race defining a plurality of tracks and a piston selectively moveable along the tracks of the outer race. The outer race assembly may further include a seal disposed about the piston and abutting the outer race about substantially an entire perimeter of the piston. The seal thereby generally seals an interface between the piston and the outer race.

20 Claims, 5 Drawing Sheets

… (1) …

EXTENDED PLUNGE CONSTANT VELOCITY JOINT

TECHNICAL FIELD

The present invention generally relates to constant velocity joints and specifically to an outer race assembly having a piston.

BACKGROUND ART

Constant velocity joints (CVJ joints) and other rotational joints are common components in automotive vehicles. Typically, constant velocity joints are used where a transmission of constant velocity rotating motion is required. The common types of constant velocity joints are plunging tripod, a fixed tripod, a plunging ball joint and a fixed ball joint. These types of joints are currently used in front wheel drive vehicles, rear wheel drive vehicles and on propeller shafts found in rear wheel drive, all wheel drive, and four wheel drive vehicles. The constant velocity joints are generally grease lubricated for life and sealed by a sealing boot when used on driveshafts or half shafts. Therefore, constant velocity joints are sealed in order to retain grease inside the joint and keep contaminants, such as dirt and water, out of the joint. To achieve this protection the constant velocity joint is usually enclosed at the opened end of an outer race by a sealing boot made of a rubber, thermoplastic, or silicone type material. The opposite end of the outer race generally is enclosed by a dome or cap, known as a grease cap in the case of a disk type joint. A mono block or integral stem and race design style joint is sealed by the internal geometry of the outer race. This sealing and protection of the constant velocity joint is necessary because contamination of the inner chamber of the joint generally will cause internal damage to the joint.

A main function of the constant velocity joint is the transmission of rotational forces and torque. A plunging joint will transmit rotational velocity while permitting relative axial displacement within the joint. Generally, a tripod joint operates as a plunging constant velocity joint while providing some degree of axial articulation. In typical joint assemblies, a variety of bolted joint designs are used to assemble a joint to a propshaft or halfshaft within the automotive vehicle. These propshaft and halfshaft assemblies are typically assembled prior to installation within a driveline of a vehicle.

When a joint is installed within a vehicle, an inner rotating component is generally plunged further into the joint in order to fit between vehicle components, e.g., a propshaft and differential. Accordingly, some extra amount of plunge capability beyond that which is necessary during ordinary operation of the vehicle must necessarily be designed into the joint. However, as the amount of lubricant required for the joint is generally dictated in part by the surface area presented by an outer rotating member within the sealed portion of the joint, the provision of this extra plunge capability requires additional lubricant within the joint, increasing costs and failure modes during operation.

Accordingly, there is a need in the art for an improved constant velocity joint that offers adequate plunge capability to facilitate installation in a vehicle while minimizing the amount of lubricant needed within the joint.

BRIEF DESCRIPTION OF DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

DETAILED DESCRIPTION

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various exemplary illustrations are provided herein of an outer race assembly for a constant velocity joint. A constant velocity joint may generally include the components of an outer race assembly, including an outer race defining a plurality of tracks, a piston selectively moveable along the tracks of the outer race, and a seal disposed about the piston and abutting the outer race about substantially an entire perimeter of the piston. The seal thereby generally seals an interface between the piston and the outer race. The constant velocity joint may further include an inner rotational member coupled for rotation with the outer race and configured to translate axially with respect to the outer race along the plurality of tracks. Further, a boot assembly may be selectively coupled to both the inner rotational member and the outer race, thereby sealing at least part of the inner rotational member to the outer race.

Figure 1:
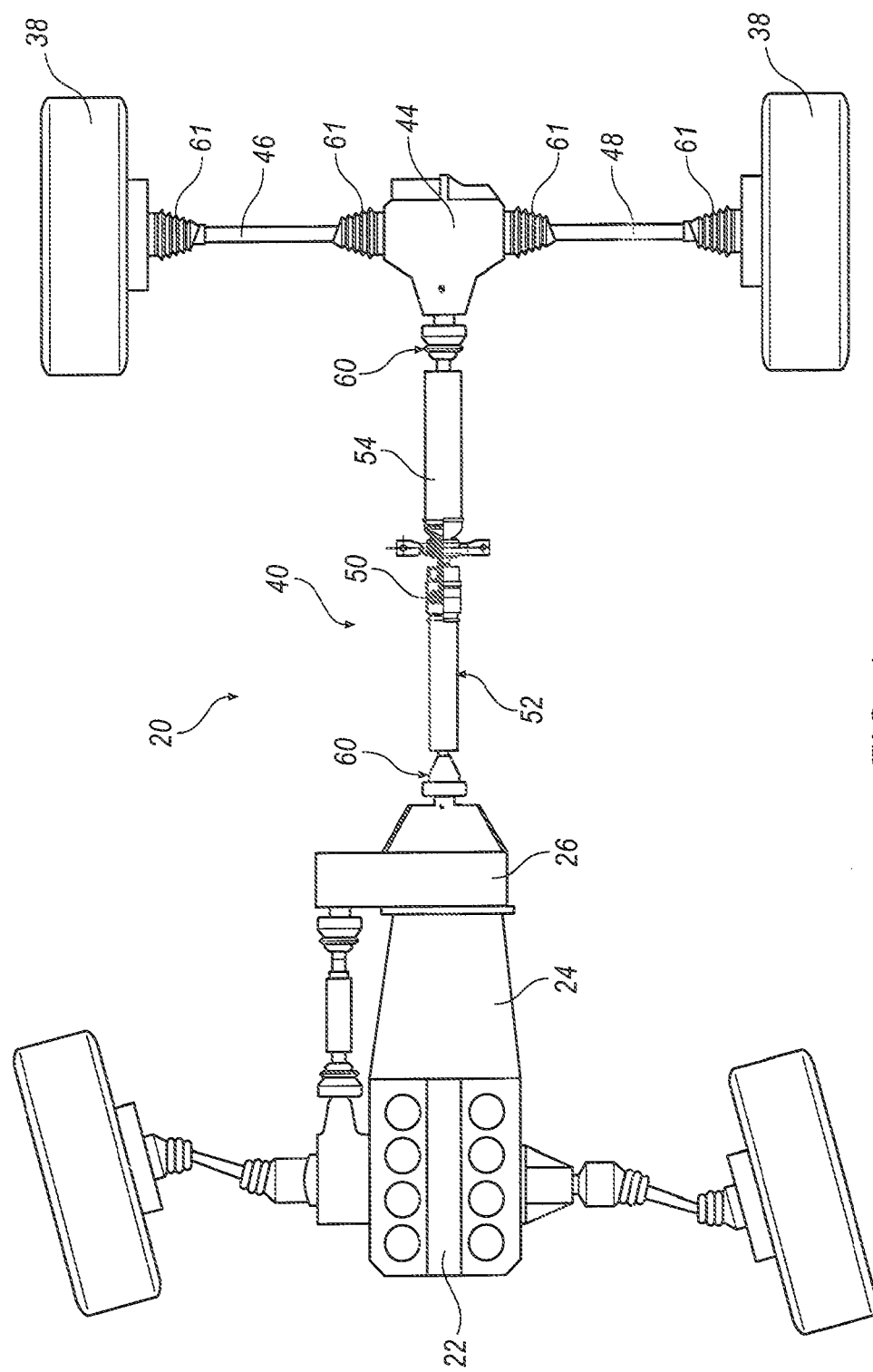
FIG. 1 is a plan view of an exemplary vehicle driveline.

Turning now to FIG. 1, a driveline 20 is illustrated for a vehicle (not shown). The driveline 20 includes an engine 22 that is connected to a transmission 24 and a power take off unit 26. The power take off unit 26 has a propeller shaft 40 extending therefrom to connect the power take off unit 26 to a rear differential 44. The rear differential 44 includes a rear right hand side shaft 46 and a rear left hand side shaft 48, each of which ends with a wheel 38 on one end thereof.

The propeller shaft 40 includes a front prop shaft 52, a rear prop shaft 54, an articulated tripode joint 50 and two high speed constant velocity joints 60. The constant velocity joints 60 transmit power from the propeller shaft 40 to the wheels 38 even if the wheels or the shaft have changing angles due to steering and suspension jounce and rebound. Additional constant velocity joints 61 are provided on both ends of the side shafts that connect to the wheels 38 and the rear differential 44.

The constant velocity joints 60, 61 may be of any of the standard types known, such as plunging, cross groove joint, fixed ball joint, fixed tripod joint, or double offset joints, all of which are commonly known terms in the art for different varieties of constant velocity joints. The constant velocity joints 60, 61 allow for transmission of constant velocities at angles which are found in everyday driving of automotive vehicles in both the side shafts and prop shafts of these vehicles.

The driveline 20 represents an all wheel drive vehicle, however it should be noted that the embodiment of the constant velocity joints 60, 61 of the current disclosure can also be used in rear wheel drive vehicles, front wheel drive vehicles, all wheel drive vehicles and four wheel drive vehicles.

Figure 2:
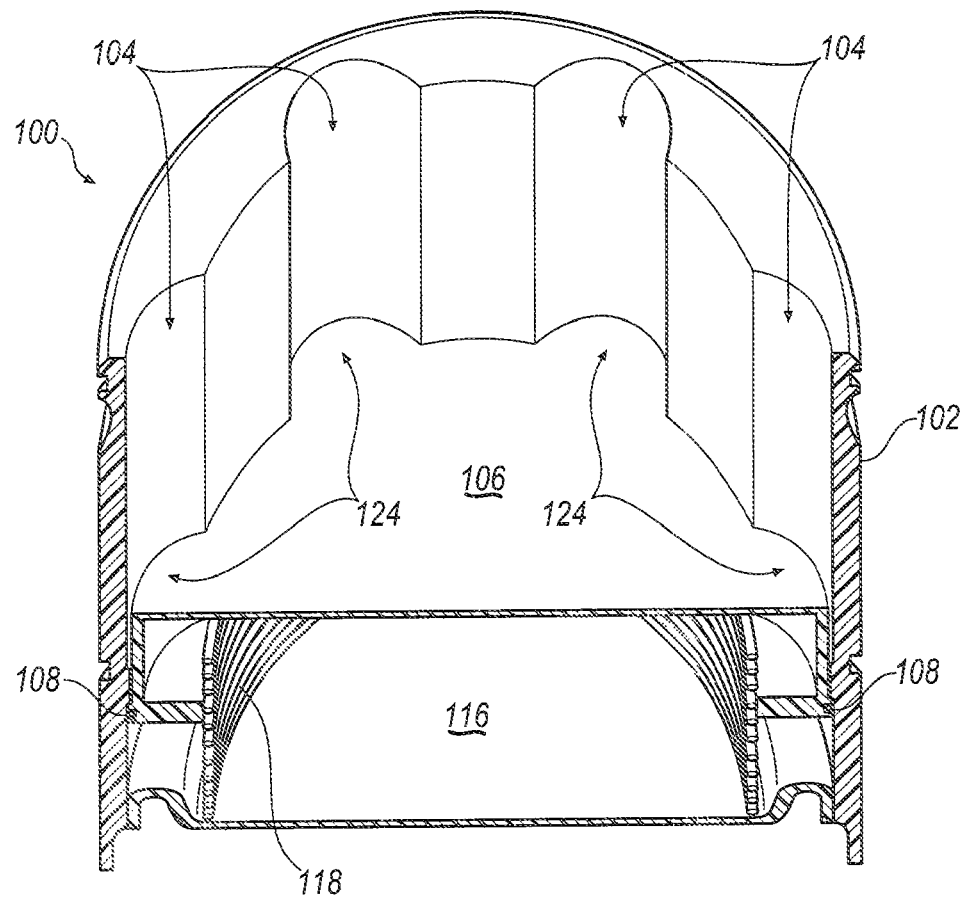
FIG. 2 is a perspective cutaway view of an exemplary outer race assembly.

Turning now to FIGS. 2-4, an exemplary plunging CV joint 60 is illustrated. The CV joint 60 may generally include an outer race 102 and an inner race or inner rotational member 110 that is coupled for rotation with the outer race 102. Further, the illustrated CV joint 60 is a plunging joint, i.e., that allows the inner rotational member to translate axially with respect to the outer race 102 along a plurality of tracks 104 formed in the outer race 102, e.g., during vehicle operation or installation of the CV joint to the vehicle. While the tracks 104 illustrated herein are shown as being generally straight tracks, i.e., that are aligned generally parallel to the central axis (not specifically shown) of the outer race 102, angled tracks may be employed as well, as will be described further below.

The inner rotational member 110 (best seen in FIGS. 3A and 3C) may include a shaft 122. Further, the inner rotational member 110 may be coupled in any known manner to the outer race 102 for transmitting power and torque via rotational motion, while also allowing the inner rotational member 110 to translate a predetermined distance along the tracks 104. For example, a plurality of rotational members such as balls, lobes, discs, wheels, or the like (not shown) may be provided that allow the outer race 102 and inner rotational member 110 to rotate together, while also allowing the inner rotational member 110 to translate axially or "plunge" within the outer race 102, and also rotate with respect to the outer race 102 to transmit power at an angle with respect to the axis of the outer race 102. The CV joint 60 may thereby permit the shaft 122 to rotate with respect to the outer race 102, e.g., at angles which are found in everyday driving of automotive vehicles in both the side shafts and prop shafts of these vehicles.

Figure 3A:
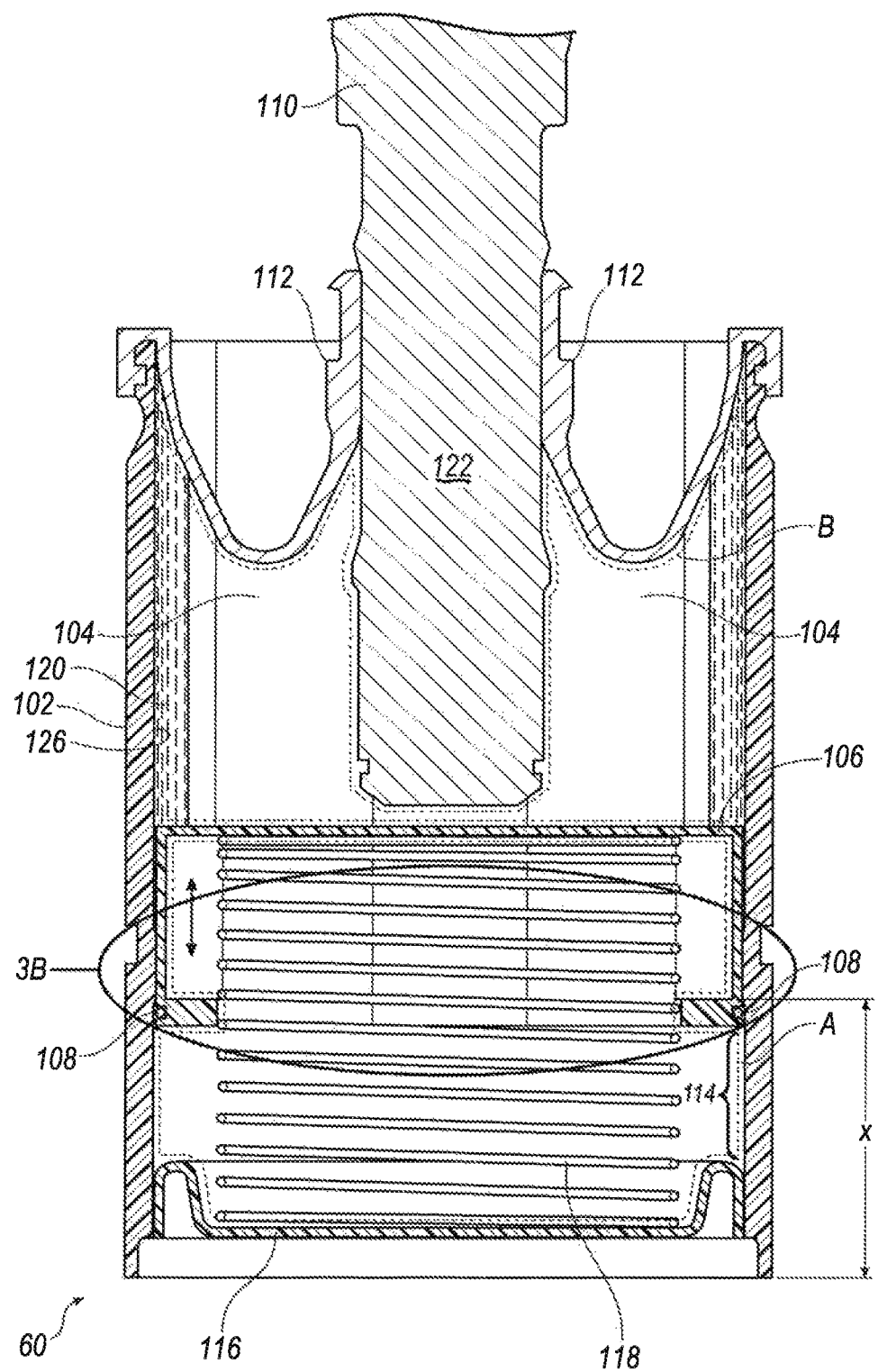
FIG. 3A is a partial cutaway view of an exemplary plunging constant velocity joint.
Figure 3B:
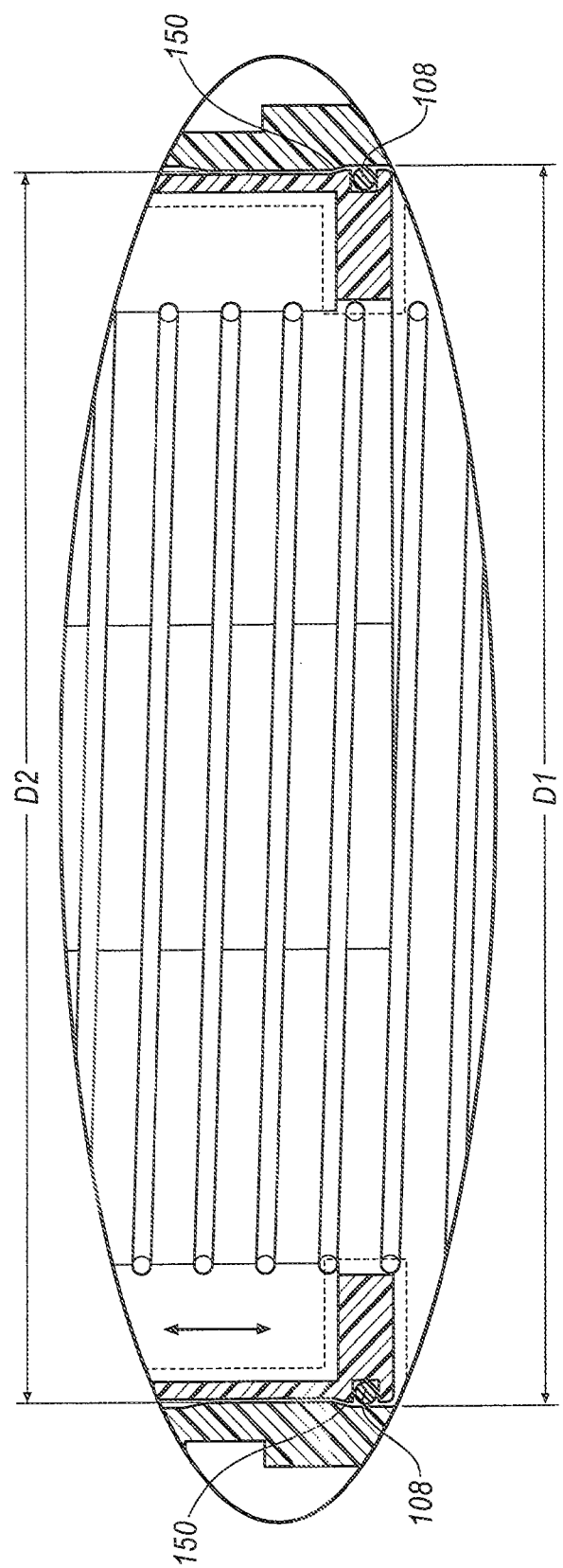
FIG. 3B is a close-up of the cutaway view of FIG. 3A.
Figure 3C:
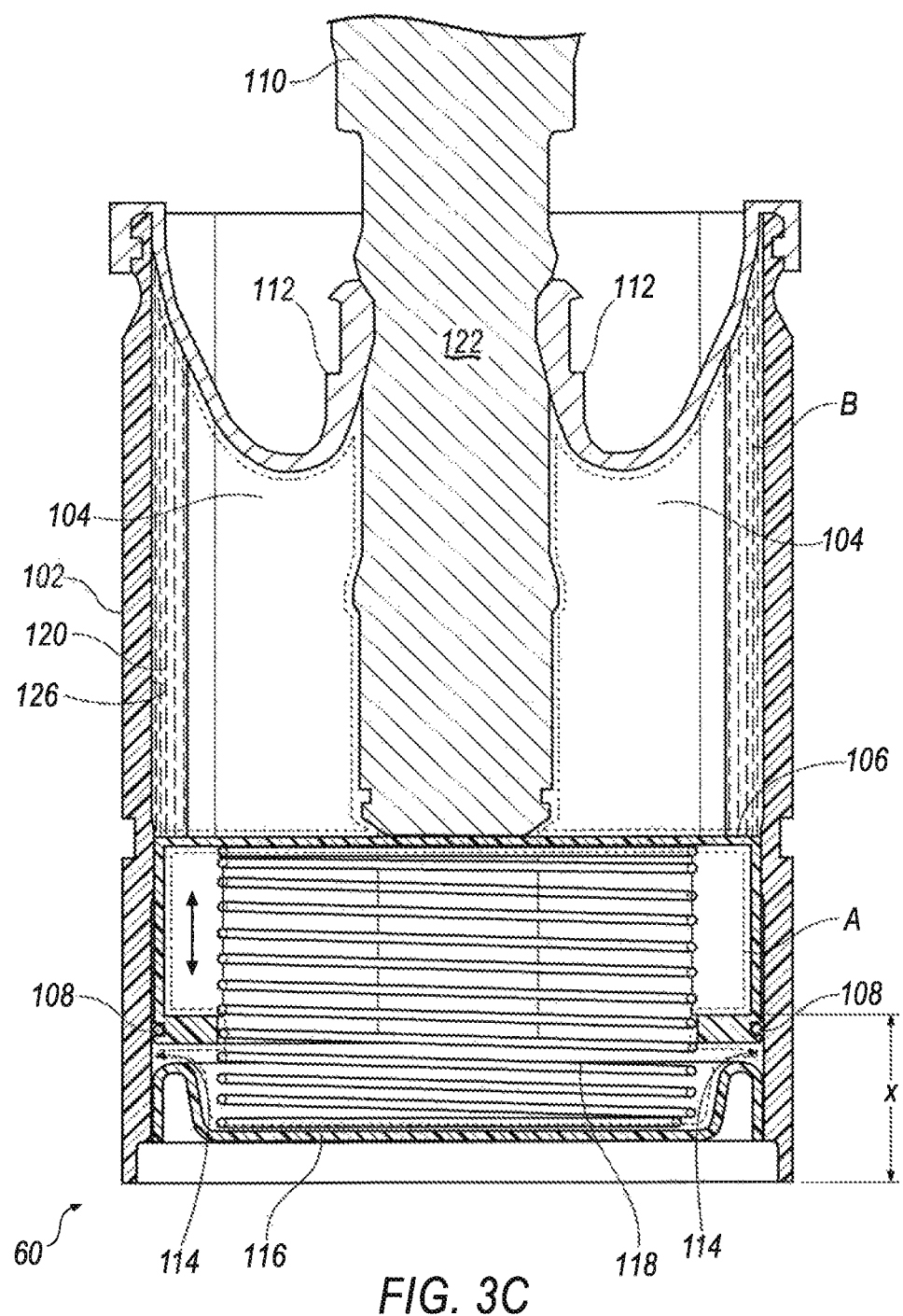
FIG. 3C is a partial cutaway view of an exemplary plunging constant velocity joint during compression of an exemplary piston.

As shown in FIGS. 3A and 3C, the CV joint 60 may further include a boot assembly 112 that is selectively coupled to the inner rotational member 110 and the outer race 102, thereby generally sealing at least part of the inner rotational member to the outer race to provide a sealed CV joint 60.

As best seen in FIG. 2, the outer race 102 may be provided as part of an outer race assembly 100 that includes the outer race 102, a piston 106 that is selectively moveable along the tracks of the outer race 102, and a seal 108 disposed about the piston. The seal 108 generally abuts the outer race 102 about substantially an entire perimeter of the piston 106, thereby generally sealing an interface between the piston 106 and the outer race 102. Accordingly, the seal 108 may prevent a lubricant (not shown) that is contained within the joint interior from intruding beyond the seal 108, as will be further described below. A cap 116 may be inserted into the end of the outer race 102, thereby cooperating with the boot assembly (not shown in FIG. 2) to generally seal the joint 60 and prevent loss of lubricant contained within the joint and also prevent intrusion of contaminants, e.g., moisture, dirt, etc.

The piston 106 is configured to selectively move along tracks 104 provided in the outer race 102. For example, the piston 106 may define a plurality of lobes 124 extending radially outward to engage the plurality of tracks 104. Further, the lobes 124 and outer profile in the general axial location of the piston 106 may generally conform to a profile of the outer race 102, thereby permitting sliding movement of the piston 106 along the outer race 102 via the tracks 104. In examples where angled tracks are employed in addition to generally axially straight tracks such as those illustrated and described herein, it may not be possible to provide lobes 124 that correspond to each of the tracks in the outer race 102 due to the need for the piston 106 to move axially within the outer race 102 and the inability to provide lobes that would engage every one of the straight tracks and angled tracks across the range of axial movement of the piston. This may reduce the ability of the seal 108 to prevent intrusion of lubricant about the entire perimeter of the piston 106, but the piston 106 may still provide at least some benefit of reducing overall lubricant needed for the joint.

The piston 106 may further define a generally circular profile at an axial position of the seal 108, thereby generally corresponding to a circular profile of the outer race 102 at the end of the outer race 102 adjacent the cap 116. While the outer race 102 and piston 106 are shown having a circular profile, other profiles may be employed so long as the profiles of the outer race 102 and piston 106 generally correspond to each other where the seal 108 is positioned on the piston 106. In one exemplary arrangement, the seal 108 abuts both the piston 106 and the outer race 102 to generally seal the interface between the piston 106 and outer race 102, while also allowing sliding movement of the piston 106 along the outer race 102. For example, as best seen in FIGS. 3A, 3B, and 3C, the outer race 102 defines a seal engaging surface 114 extending axially along the outer race 102. The seal 108 is thus configured to selectively slide along the seal engaging surface 114. The seal engaging surface 114 defines a generally circular profile that corresponds to the profile of the piston 106, thereby allowing a consistent seal about the perimeter of the piston 106 where the seal 108 is located axially with respect to the piston 106.

As briefly mentioned above, a cap 116 is inserted into the outer race 102. Further, a biasing element 118 may also be disposed between the piston 106 and the cap 116, such that the biasing element 118 urges or biases the piston 106 away from the cap 116. In one exemplary arrangement, the biasing element 118 is configured as a spring. The biasing element 118 preferably has a spring force low enough to generally permit the piston 106 to be slid toward the cap 116 (as shown in FIG. 3C) according to the plunging of the shaft 122 into the joint 60, e.g., during installation of the CV joint 60 into a vehicle. Additionally, the biasing element 118 may define a tension adequate to generally maintain the piston 106 at a maximum extension of the biasing element 118, thereby maintaining the piston 106 at a maximally extended position (as shown in FIG. 3A) during operation of a vehicle. For example, the biasing element 118 may define a sufficient biasing force to resist a force urging the piston 106 toward the cap 116 during operation.

As one illustration, as the joint 60 is rotated at high speed typical during operation, any lubricant 120 contained within the joint 60 will generally be forced radially outwards by centrifugal force resulting from the joint rotation. The lubricant 120 will therefore tend to accumulate along the inner surface 126 of the outer race 102 as shown in FIGS. 3A and 3C, and exert an axial force upon the piston 106 that is proportional to the lubricant density, the total volume of lubricant 120 in the joint, and the contact area of the lubricant 120 with the piston 106 when the lubricant 120 is substantially entirely forced radially outward against the inner surface 126 of the outer race 102. Accordingly, in one exemplary illustration the biasing element 118 has a biasing force sufficient to resist these forces. Additionally, the biasing element 118 may have a sufficient biasing force to resist these forces and maintain the piston 106 against a reduced diameter portion of the outer race 102, as will be described further below.

As best seen in FIGS. 3A and 3C, the cap 116 is inserted into one end of the outer race 102, while the inner rotational member 110 and boot assembly 112 are received in an opposite end of the outer race 102. At the end where the cap 116 is received, the piston 106, the outer race 102, and the sealed interface between the piston 106 and the outer race 102, as generally defined by the seal 108, cooperate to define an enclosed volume A. At the same time, a joint interior B is defined by the outer race 102, the piston 106, the sealed interface between the outer race 102 and piston 106, the inner rotational member 110, and the boot assembly 112. The joint interior B may be provided with lubricants 120 to permit movement of the inner rotational member 110 within the outer race 102 during operation, e.g., sliding and rotational movement of the inner rotational member 110 with respect to the outer race 102. The joint interior B may generally be sealed, such that lubricants 120 contained within the joint interior B are generally prevented from escaping from the joint interior B during operation of the joint 60. At the same time, the joint interior B may be vented via one or more vents (not shown) to allow gases contained within the joint interior B to escape the joint interior B to the atmosphere. Similarly, the enclosed volume A may also be generally sealed to prevent free exchange of lubricants 120 with the joint interior B and the atmosphere, while still allowing some gaseous exchange between the joint interior B and the enclosed volume A, and also with the atmosphere, that may be necessary during operation of the joint. Further, the cap 116 may be provided with any known vent mechanism (not shown) for allowing gas exchange between the enclosed volume A and the atmosphere while generally preventing loss of lubricants 120 to the atmosphere. The generally sealed interface between the piston 106 and outer race 102, i.e., as defined by the seal 108, generally prevents intrusion of any lubricants 120 or other foreign matter contained within the joint interior B from intruding into the enclosed volume A during the installation and operation of the CV joint 60, while permitting some gas exchange between the enclosed volume A and joint interior B.

The slidable sealed interface provided by the piston 106 and seal 108 as the piston 106 is selectively translated axially with respect to the outer race 102 advantageously allows a reduced amount of lubricant 120 to be employed within the CV joint 60. More specifically, the amount of lubricant 120 required in a joint is generally directly proportional to the surface area presented by the outer race 102 within the joint 60. Accordingly, as the piston 106 and seal 108 generally maintain an extended position during operation of the joint 60, i.e., after installation of the joint 60 to the vehicle, the piston 106 and seal 108 effectively close off a portion of the outer race 102, reducing the amount of lubricant 120 necessary for proper operation of the joint 60. Further, the piston 106 and seal 108 may be translated axially with respect to the outer race 102 toward the cap 116 during installation, as may be necessary to provide additional plunge depth of the inner rotational member 110 to allow the joint 60 to fit between the vehicle components to which it is installed, e.g., a propeller shaft and a differential.

The enclosed volume A is therefore selectively adjustable by changing an axial position of the piston 106 with respect to the outer race 102. For example, during operation the piston 106 and seal 108 maintain a maximally extended position, e.g., as shown in FIG. 3A, that minimizes the total surface area of the outer race 102 presented within the joint interior B and maximizes the volume of the enclosed volume A. The biasing element 118 may bias the piston toward a maximally extended position, as described above. Further, during installation of the CV joint 60 the piston 106 and seal 108 may be slid toward the cap 116 to allow additional plunging of the inner rotational member 110 and fit the CV joint 60 in between the components to which is it secured.

As best seen in FIG. 3B, the outer race 102 may define a first diameter D1 along the seal engaging surface 114, and a second diameter D2 along the plurality of tracks 104. The diameter D1 generally corresponds to a seal diameter defined by the seal 108, such that the diameter D1 and seal diameter 108 are generally equal, allowing for an interference fit of the seal 108 and piston 106 that allows the seal 108 to slide along the seal engaging surface 114, while also adequately preventing intrusion of lubricants from the joint interior B into the enclosed volume A. Further, the second diameter D2 of the outer race 102, e.g., a maximum diameter defined by the tracks 104, may be smaller than the seal diameter of the seal 108, such that the piston 106 is generally prevented from movement along said tracks beyond a predetermined distance X from the cap 116. The outer race 102 may thereby allow the piston 106 to slide along the seal engaging surface 114, while preventing interference of the piston 106 with the inner rotational member 110 during operation of the CV joint 60. For example, it may be desirable to prevent the piston 106 from intruding into the joint interior B far enough to contact the shaft 122 during operation of the CV joint 60 when the shaft 122 is permitted to plunge within the joint 60.

The first and second diameters D1, D2 of the outer race 102 may define a transition 150 where the outer race 102 interior surface narrows from the larger diameter D1 to the maximum diameter D2 of the tracks 104. The transition 150 may be a sloped transition, for example as shown in FIG. 3B. Any other configuration of a transition 150 may be employed, e.g., a step feature defining a surface perpendicular to the axial travel of the piston 106. The transition 150, e.g., as defined in part by the reduced diameter portion of the outer race 102, may also align the piston 106 during operation of the CV joint 60, thereby enhancing the sealing effect of the piston 106 and/or seal 108. More specifically, the reduced diameter D2 of the outer race 102 may extend about an entire circumference of the piston 106 adjacent the seal 108, such that the greater seal diameter presented by the seal 108 does not permit further movement of the piston 106 away from the cap 116, while the biasing element 118 urges the piston 106 and/or seal 108 against the reduced diameter portion of the outer race 102. The transition 150 may generally align the piston 106 within the outer race 102 when the piston 106 is urged into a maximally extended position furthest away from the cap 116, such that the transition 150 provides a reaction surface for the piston 106, e.g., in response to the force of the biasing element 118.

In one exemplary illustration, the piston 106 is formed of a lightweight material, e.g., a plastic or lightweight steel material, so that the piston 106 does not interfere with a crush or energy absorption characteristic of the joint 60. Specifically, during a crash associated with the vehicle the shaft 122 may generally be forced through the joint 60 and against the piston 106 and/or cap 116 with sufficient force to "punch out" the cap 116. This crush and "punch out" of the cap 116 may reduce transfer of vehicle crush forces along driveline components to vehicle occupant structures, thereby improving occupant safety in a crash. While the piston 106 will necessarily absorb some degree of energy from any crush of the piston 106, this effect may be minimized by employing a lightweight plastic or steel material for the construction of the piston 106. Accordingly, the piston 106 would not interfere with the shaft 122 as it "punches out" the cap 116 from the outer race 102, at least to the extent that the piston 106 does not significantly hinder a desired energy absorption characteristic of the joint 60.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain approaches, examples or embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description.

The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A constant velocity joint, comprising:
   an outer race defining a plurality of tracks;
   a piston positioned within said outer race and selectively moveable along said tracks of said outer race;
   a seal disposed about said piston and abutting said outer race about substantially an entire perimeter of said piston, thereby generally sealing an interface between said piston and said outer race;
   an inner rotational member coupled for rotation with said outer race and configured to translate axially with respect to said outer race along said plurality of tracks;
   a boot assembly selectively coupled to both the inner rotational member and the outer race, thereby sealing at least part of the inner rotational member to the outer race;
   a cap disposed at a first end of said outer race, said first end being opposite a second end of said outer race receiving said inner rotational member, wherein said cap, said piston, said outer race, and said sealed interface between said piston and said outer race cooperate to define an enclosed volume (A); and
   a biasing element disposed in said enclosed volume (A) and extending from said piston to said cap, and said biasing element biases said piston away from said cap.

2. The constant velocity joint of claim 1, wherein said outer race defines a seal engaging surface extending axially along said outer race, said seal configured to selectively slide along said seal engaging surface.

3. The constant velocity joint of claim 2, wherein said outer race defines a first diameter along said seal engaging surface and a second diameter along said plurality of tracks, said first diameter corresponding to a seal diameter defined by the seal, said second diameter being smaller than said seal diameter such that said piston is generally prevented from movement along said tracks beyond a predetermined distance.

4. The constant velocity joint of claim 1, wherein said cap is inserted into said first end of said outer race.

5. The constant velocity joint of claim 4, further comprising a lubricant contained within a joint interior (B) defined by said outer race, said piston, said sealed interface, said inner rotational member, and said boot assembly, wherein said sealed interface generally prevents intrusion of said lubricant into said enclosed volume (A).

6. The constant velocity joint of claim 4, wherein said enclosed volume (A) is selectively adjustable by changing an axial position of said piston with respect to said outer race.

7. The constant velocity joint of claim 1, further comprising a shaft fixed for rotation with said inner rotational member, wherein said boot assembly is coupled to said inner rotational member via said shaft.

8. The constant velocity joint of claim 7, wherein said piston is configured to selectively move along said tracks when said shaft abuts said piston.

9. The constant velocity joint of claim 1, wherein said piston defines a plurality of lobes extending radially outward to engage said plurality of said tracks of said outer race.

10. The constant velocity joint of claim 9, wherein said piston defines a circular profile at an axial position of said seal, said circular profile generally corresponding to a circular profile of said outer race.

11. The constant velocity joint of claim 1, wherein said biasing element is a helical spring disposed in said volume (A) and extending from said piston to said cap disposed at the first end of said outer race.

12. An outer race assembly for a constant velocity joint, comprising:
    an outer race defining a plurality of tracks;
    a piston secured to said outer race and selectively moveable along said tracks; and
    a seal disposed about said piston, said seal abutting said piston and said outer race about substantially an entire perimeter of said piston, thereby generally sealing an interface between said piston and said outer race;
    a cap disposed at a first end of said outer race, said first end being opposite a second end of said outer race, wherein said cap, said piston, said outer race, and said sealed interface between said piston and said outer race cooperate to define an enclosed volume (A); and
    a biasing element disposed in said volume (A) and extending from said piston to said cap, biases said piston away from said cap.

13. The outer race assembly of claim 12, wherein said outer race defines a seal engaging surface extending axially along said outer race, said seal configured to selectively slide along said seal engaging surface.

14. The outer race assembly of claim 13, wherein said outer race defines a first diameter along said seal engaging surface and a second diameter along said plurality of tracks, said first diameter corresponding to a seal diameter defined by the seal, said second diameter being smaller than said seal diameter such that said piston is generally prevented from movement along said tracks beyond a predetermined distance.

15. The outer race assembly of claim 14, wherein said first and second diameters cooperate to define a transition, said transition providing a reaction surface for said piston when said piston is urged axially with respect to said outer race against said transition.

16. The outer race assembly of claim 12, wherein said cap is inserted into said first end of said outer race.

17. The outer race assembly of claim 16, wherein said enclosed volume (A) is selectively adjustable by changing an axial position of said piston with respect to said outer race.

18. The outer race assembly of claim 12, wherein said piston defines a plurality of lobes extending radially outward to engage said plurality of said tracks of said outer race.

19. The outer race assembly of claim 18, wherein said piston defines a circular profile where said seal is positioned axially with respect to said piston, said circular profile generally corresponding to a circular profile of said outer race.

20. The constant velocity joint of claim 12, wherein said biasing element is a helical spring disposed in said volume (A) and extending from said piston to said cap disposed at the first end of said outer race.

* * * * *